United States Patent [19]
Quetel et al.

[11] Patent Number: 6,043,497
[45] Date of Patent: Mar. 28, 2000

[54] PHOTO-IMPRINTING STAND FOR THE MAKING OF BRAGG GRATINGS

[75] Inventors: Lionel Quetel, Tredrez; Loïc Rivoallan, Kermoroc'h, both of France

[73] Assignee: France Telecom, Paris, France

[21] Appl. No.: 09/093,220

[22] Filed: Jun. 8, 1998

[30] Foreign Application Priority Data

Jun. 10, 1997 [FR] France .................................. 97 07189

[51] Int. Cl.⁷ .................................................. H01J 37/00
[52] U.S. Cl. ........................................... 250/492.1; 385/37
[58] Field of Search ............................ 250/492.1; 385/37

[56] References Cited

U.S. PATENT DOCUMENTS

| | | | |
|---|---|---|---|
| 5,004,673 | 4/1991 | Vlannes ................................... | 430/325 |
| 5,104,209 | 4/1992 | Hill et al. ................................. | 385/27 |
| 5,327,515 | 7/1994 | Anderson et al. ....................... | 385/123 |
| 5,367,588 | 11/1994 | Hill et al. ................................. | 385/37 |
| 5,636,304 | 6/1997 | Mizahi et al. ............................ | 385/37 |
| 5,652,818 | 7/1997 | Bryon ........................................ | 385/37 |
| 5,748,814 | 5/1998 | Painchaud et al. ...................... | 385/37 |
| 5,898,804 | 4/1999 | Wickmham .............................. | 385/37 |
| 5,912,999 | 6/1999 | Brennan et al. .......................... | 387/37 |

FOREIGN PATENT DOCUMENTS

| | | |
|---|---|---|
| 0 805 365 | 11/1997 | European Pat. Off. . |
| 96/36895 | 11/1996 | United Kingdom . |
| 2 302 599 | 1/1997 | United Kingdom . |

*Primary Examiner*—Bruce C. Anderson
*Attorney, Agent, or Firm*—Nilles & Nilles SC

[57] ABSTRACT

A photo-imprinting stand for the making of Bragg networks on a photosensitive waveguide or on optical fibers is used to obtain an apodization of the grating. The stand has a dynamic masking device having a variable surface with respect to the beam of UV rays during the photo-imprinting carried out by insolation of the guide using a beam of ultra-violet rays and an interferometry device. Application to the apodization of Bragg gratings.

7 Claims, 6 Drawing Sheets

Zones blocking the power

Shape of the blade to be determined

PHOTO-IMPRINTING STAND FOR THE MAKING OF BRAGG GRATINGS

BACKGROUND OF THE INVENTION

1. Field of the Invention

The invention relates to a photo-imprinting stand for the making of Bragg gratings.

It can be applied in the different methods used for the photo-imprinting of Bragg gratings on all types of photosensitive optical waveguides and especially on optical fibers.

Hereinafter, the terms 'photosensitive optical waveguide' and 'optical fiber' shall be used without distinction, it being clear that a fiber section is nothing other than an optical guide.

2. Description of the Prior Art

It may be recalled that a photo-imprinting stand for the making of Bragg gratings comprises, in a known way, a radiation source 1 capable of insolating an optical waveguide or optical fiber 4. The insolation is done by means of an optical device 2 used to obtain an interference field.

A schematic drawing of a photo-imprinting stand is shown in FIG. 1.

The photo-imprinting of a Bragg grating consists of the insolating of a fiber by means of a system of ultraviolet interference fringes in order to create a permanent variation in index at the core of the fiber that is periodic along its axis. The index modulation depth is a function of the power received as well as the exposure time.

The interference fringes can be obtained by different methods, namely the use of a phase mask or a method of inteferometry.

The recording can be done either through a scanning by an ultraviolet beam before the guide or by means of an extended beam, namely a beam that irradiates the entire guide.

In FIG. 1, it has been assumed that a ultraviolet beam with a small width is used and the shifting of this beam is symbolized by the arrow D shown in dashes.

The reference 3 symbolizes the interference field obtained by the optical system 2.

In recent years, the making of Bragg gratings has undergone development.

Indeed, these gratings used in reflection or in transmission are introduced into many optical functions performed by devices such as lasers, demultiplexers, chromatic dispersion compensators, sensors, etc.

Their uses in certain applications have revealed certain requirements as regards their characteristics. A standard Bragg grating has a reflection spectrum that possesses substantial smearing, namely residual reflection outside the band. Furthermore, the reflection in the neighborhood of the Bragg wavelength is not constant. The chromatic dispersion compensator gratings must possess a linear dispersion. This set of constraints requires that the gratings should be apodized, namely that it is necessary to create a continuous variation of the index modulation depth at the ends of the grating. Various methods of apodization have already been proposed.

In a first approach, for example, the interference fringes at the ends of the grating are scrambled. Reference can be made for further details to the document [1] "Simple Technique for Apodizing Chirped and Unchirped Fiber Bragg Gratings", in Electronics Letters, 20th June 1996, Vol. 32, No. 13 or the document [2] entitled "Moving Fiber/Phase Mask-Scanning Beam Technique For Enhanced Flexibility in Producing Fiber Gratings With Uniform Phase Mask" in Electronics Letters, 17th August 1995, Vol. 31, No. 17.

A second approach consists of the use of a specific phase mask having a variable diffraction efficiency. Reference can be made for further details to the document [3] entitled "Apodization of the Spectral Response of Fiber Bragg Gratings using a Phase Mask with Variable Diffraction Efficiency" published in Electronics Letters, 2nd February 1995, Vol. 31, No. 3.

A third approach consists in obtaining a variation in the intensity by using a wide beam having an appropriate profile,: for example a Gaussian profile, or by using beam masking operations and carrying out for example a twofold exposure of the guide. The first exposure is done in the presence of a mask and without a phase mask and the second exposure is done in the presence of the phase mask and a second mask forming a "bell-shaped" beam profile that is complementary to the mask of the first exposure. This twofold exposure gives a mean index elevation that is constant along the grating. Reference can be made for further details to the document [4] entitled "Apodized In-Fiber Bragg Grating Reflectors Photo-Imprinted Using A Phase Mask" published in Electronics Letters, 2nd February 1995, Vol. 31, No. 3.

This last-named technique is cumbersome to implement. Moreover, present-day techniques of power variation along the grating by masking or by the use of a wide beam with an adapted profile do not permit high reproducibility of the ultraviolet power profile along the fiber.

The techniques using a scrambling of fringes at the ends of the grating during the photo-imprinting cannot be used for strict control over the profile of the desired depth of modulation. Furthermore, not every type of profile can be obtained.

Since phase masks with a variable diffraction efficiency can be used only for one model of grating, each model requires a different mask.

SUMMARY OF THE INVENTION

The present invention makes it possible to overcome these drawbacks. More specifically, an object of the invention is a photo-imprinting stand for the making of Bragg gratings on a photosensitive optical waveguide by the insolation of said waveguide by means of a beam of ultraviolet rays and an interferometry device, wherein said device furthermore comprises a masking device with a variable surface in relation to the ultraviolet ray beam used during the photo-imprinting.

Advantageously, the masking device with variable surface comprises at least one rotating shutter of a given shape for a profile of a desired intensity and means to shift the masking device before the ultraviolet beam.

According to one embodiment, the shutter has a square shape which, when it is put into rotation and shifted before the beam, makes it possible to obtain a profile with the shape of a rectangular curve having attenuated edges for the ultraviolet power received by the guide and the fiber.

According to another embodiment, the shutter has a shape of a double pike-head which, when it is put into rotation and shifted before the beam, makes it possible to obtain a profile having the shape of a rectangular curve with sinusoidal edges for the ultraviolet power received by the guide or the fiber.

BRIEF DESCRIPTION OF THE DRAWINGS

Other advantages and particular features of the invention shall appear from the following description given by way of an illustration that in no way restricts the scope of the invention and is made with reference to the appended drawings, of which.

MORE DETAILED DESCRIPTION

The invention makes it possible to create a variation of mean ultraviolet power along the fiber in order to create a variation of the depth of modulation along the grating formed. To this end, a masking device 10 with a variable surface is placed in the path of the ultraviolet beam.

Owing to its surface variations before the UV beam, this device achieves a "dynamic" masking during the photo-imprinting. This device is hereinafter called an apodization device for it advantageously enables an apodization to be carried out.

This apodization device 10 can be placed either before the interferometry device 2 or after the formation of the interference fringes. It will preferably be placed before, namely between the light source 1 and the device 2, when this device 2 is a phase masking device so that this phase masking device can be placed sufficiently close to the guide.

The apodization device 10 could be placed after the device for the formation of interference fringes.

According to the invention, the apodization device 10 is shifted during the photo-imprinting before the UV beam as represented by the arrow D', and it has a variable masking surface during the shifting to obtain a variation of mean power along the fiber during this photo-imprinting of the grating.

Figure 1:
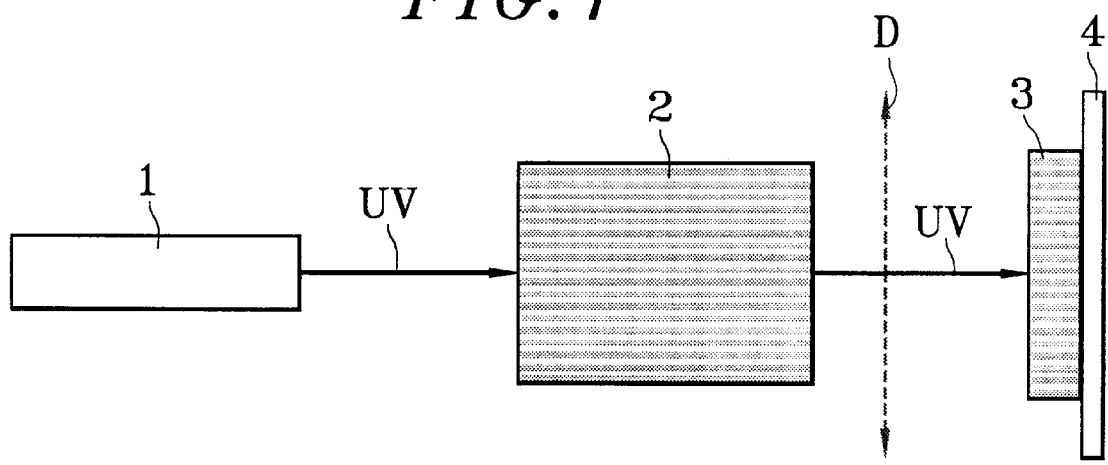
FIG. 1 shows a schematic drawing of a prior art photo-imprinting stand.
Figure 2:
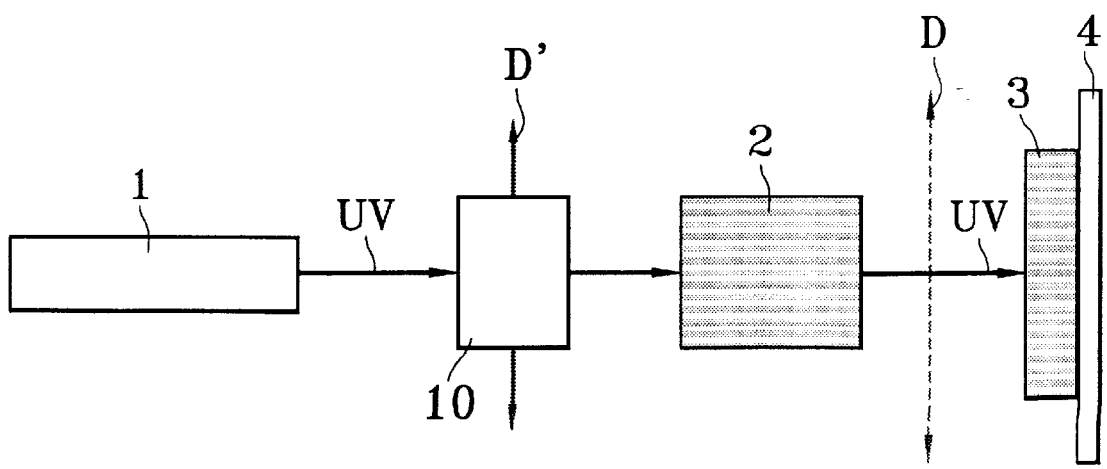
FIG. 2 shows a schematic drawing of a photo-imprinting stand according to the invention.
Figure 3:
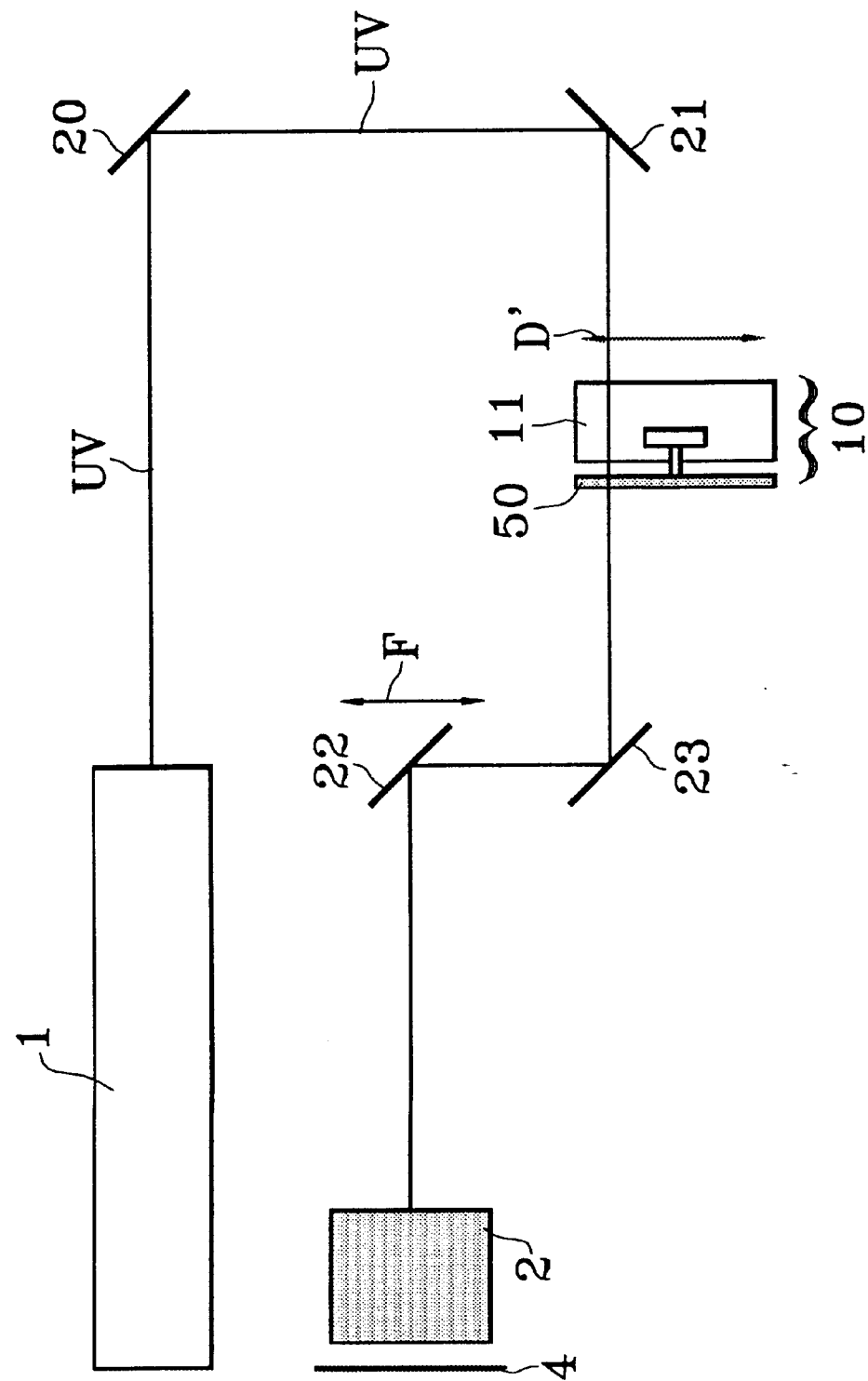
FIG. 3 shows a photo-imprinting stand according to an exemplary layout.

FIG. 3 shows a possible configuration of a photo-imprinting stand where a narrow scanning beam is used. This scanning is done at the onward reflection mirror 22 by a translation of this mirror 22 along the arrow F. The beam reaches the onward reflection mirror 22 after being sent on to it by another onward reflection mirror 23 according to this exemplary embodiment.

Figure 4:
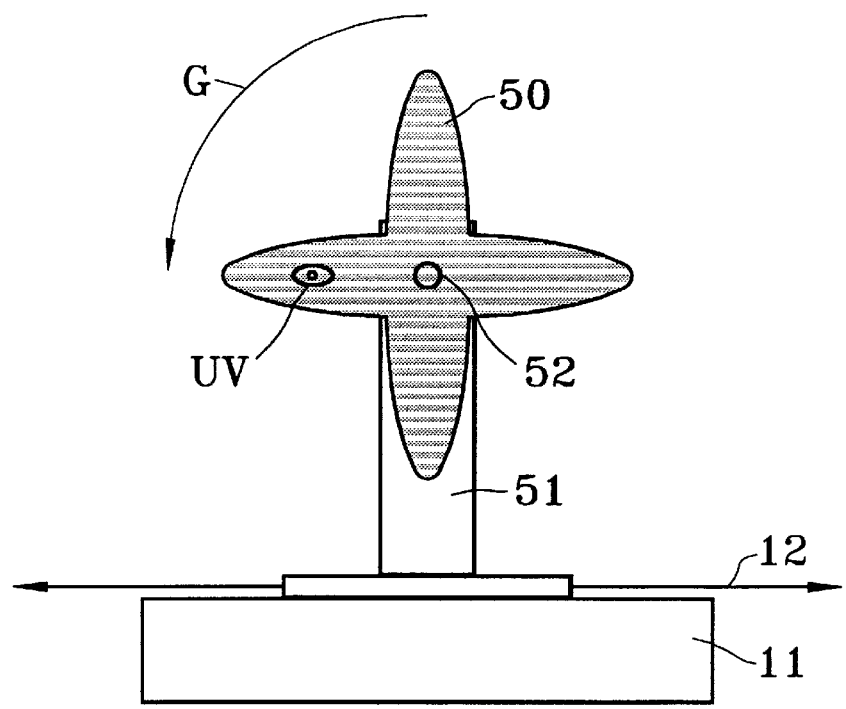
FIGS. 4 and 5 show a drawing of a masking device with variable surface according to a first embodiment for the shutter.
Figure 5:
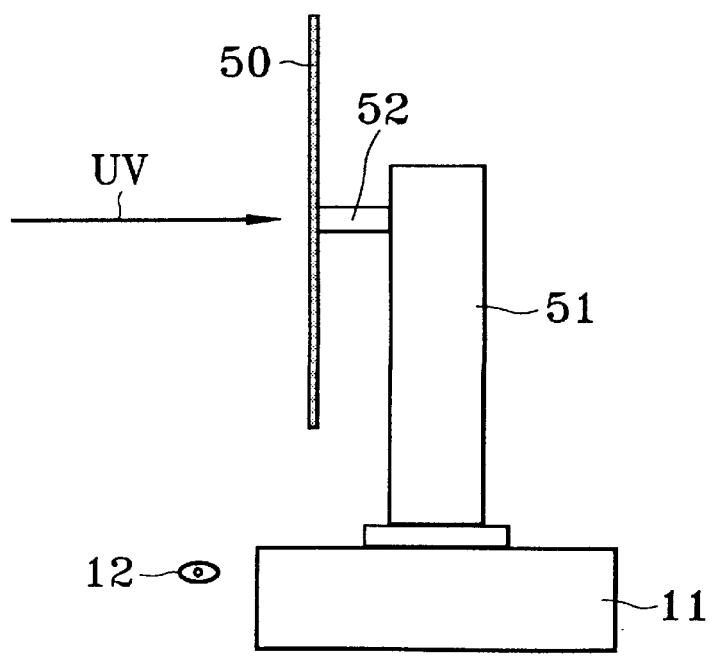

The apodization device 10 is placed on the path of the beam by a translation table 11 on which there is mounted a motor rotating at an unspecified frequency as shall be described in detail from FIGS. 4 and 5.

The device shifts in the beam by means of the table 11 and is used to mask the UV beam during a period of time that is variable as a function of the speed of shift of the table.

In a practical way, to obtain an apodization, it is necessary that the power of the beam should be continuously attenuated at the ends of the grating.

For this purpose (cf. FIG. 10), the apodization device 10 will be shifted before the beam during the photo-imprinting operation which lasts from t0 to t8 between the instants t0 and t1 and then between the instants t7 and t8. The total duration of the photo-imprinting is T=t8−t0. The beam is initially (at the instant t0) totally blocked by the device (output power zero). The unblocking during the period t0–t1 is done by a forward movement of the device. The blocking during the period t7–t8 is done by a return of the device. The device is held still during the period t1–t7.

FIGS. 3 and 4 illustrate an embodiment of an apodization device according to the invention.

The device has a rotating shutter 50 activated by a motor 51. The shutter 50 is mounted on a shaft 52 and, in this example, has two blades. The blades rotate and conceal the UV beam during their rotational motion symbolized by the arrow G while the plate shifts along its translation axis 12.

FIG. 6 shows a second embodiment of the rotating shutter 50. In this embodiment, the rotating shutter is formed by a blade having the shape of a full square. The blade is put into rotation around its axis 52.

Hereinafter in the description of the phenomenon, it is assumed that the beam is fixed and is at the point X0=0.

Figure 6A:
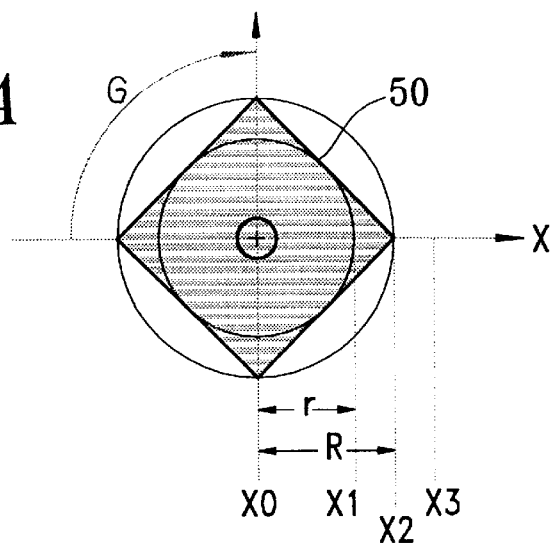
FIG. 6 shows the drawing of a shutter according to a second embodiment.
Figure 6B:
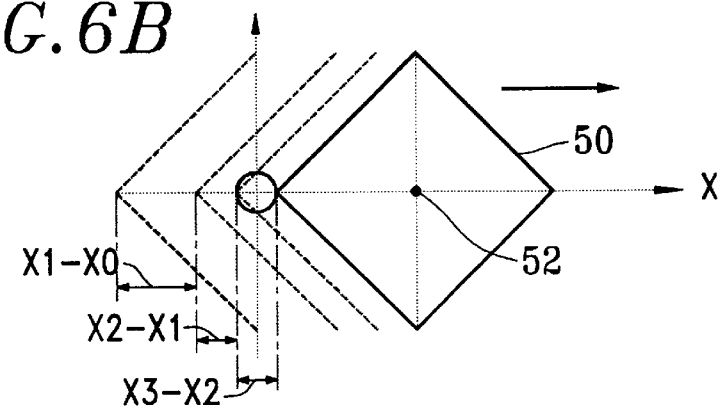

During the rightward shift on the plane of FIG. 6A or 6B, the blade will block the beam up to the abscissa point X1=r (r being the radius of the inner circle of the blade). This is a function of the width of the beam.

When the device shifts towards the right on the axis X from a point X1 to the point X2 (X1=R radius of the external circle of the device), the beam (at X0) is alternately blocked and then free owing to the rotation of the blade.

When the device has travelled a path from the point X2 to the point X3 (X3>X2), the beam is free and the power of the beam received by the grating is the maximum.

Figure 7:
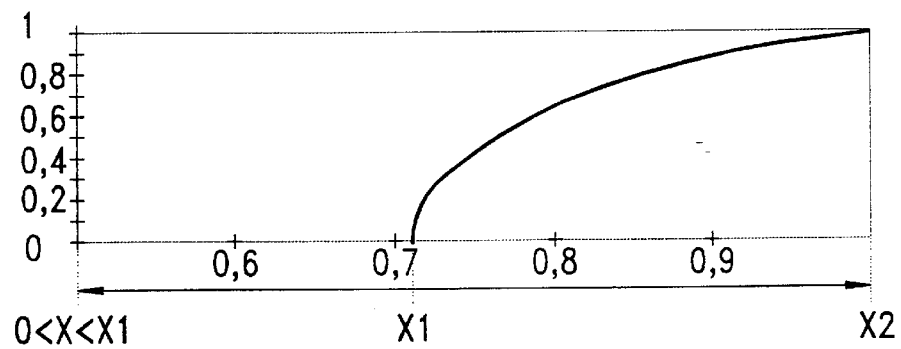
FIG. 7 shows a drawing of a curve of variation of the power of the ultraviolet ray after masking by the shutter shown in FIG. 6.

The shifting of the blade from the point X1 to the point X2 before the beam results in a variation of the UV power received by the guide during the corresponding period represented by the curve of FIG. 7.

Figure 8:
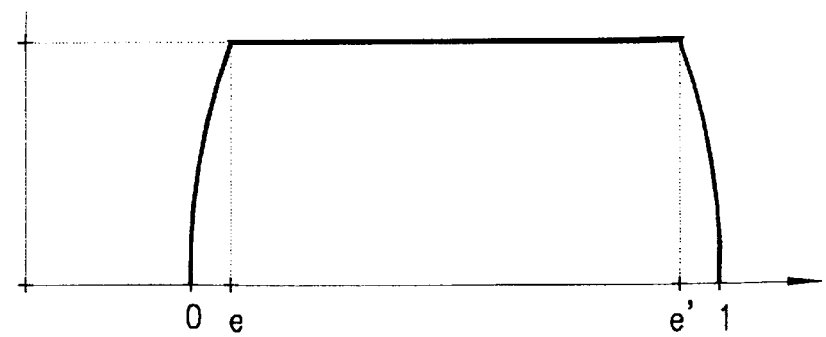
FIG. 8 shows a drawing of the profile of variation of power of the ultraviolet ray along the guide with a shutter according to FIG. 6.

FIG. 8 shows a profile of variation of UV power perceived by the photo-recorded guide for a blade having the shape shown in FIG. 6. The length of the guide is 1.

The blade is shifted in the beam during a period d on an outgoing path e (which corresponds for example to the path X1–X2 of FIG. 7). The blade is shifted again before the beam for a duration d during a return path 1-e'. The power profile obtained corresponds to a crenellated shape with attenuated edges.

Figure 9:
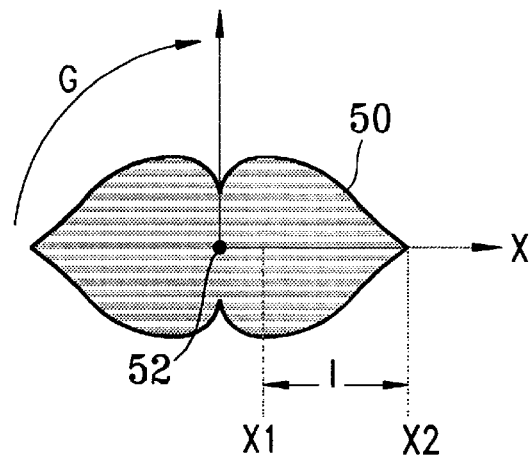
FIG. 9 shows a drawing of a shutter according to a third embodiment.
Figure 10:
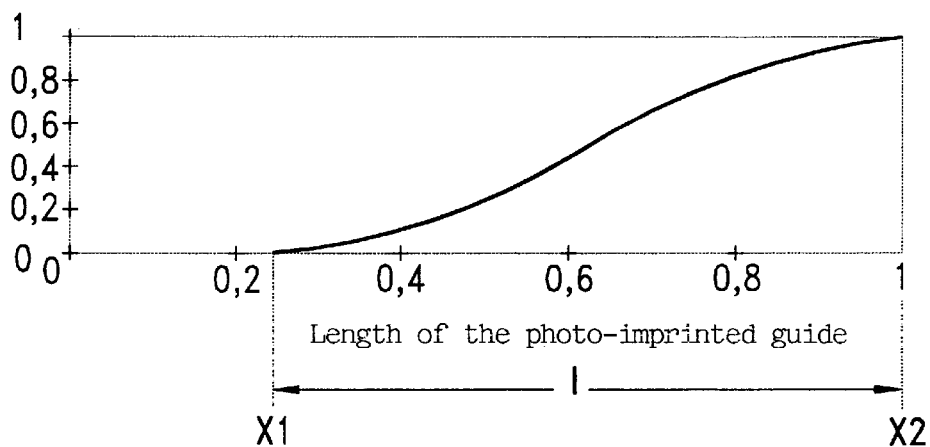
FIG. 10 shows a drawing of a curve of variation of the power of the ultraviolet ray after masking by the shutter shown in FIG. 9.
Figure 11:
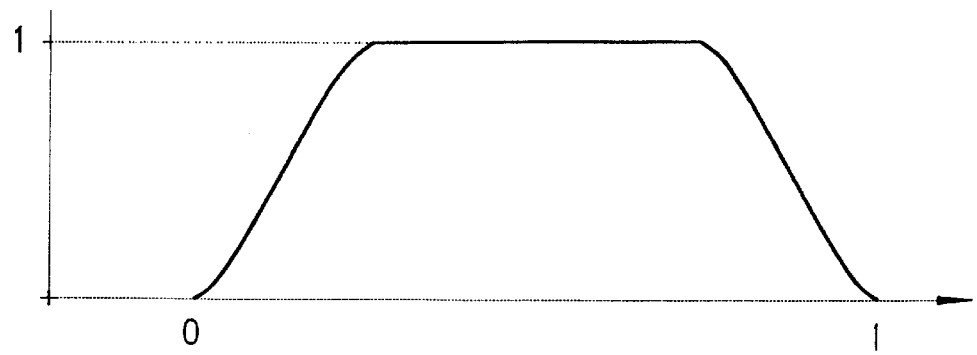
FIG. 11 shows the drawing of the profile of variation of power of the ultraviolet ray along the guide with a shutter according to FIG. 9, FIGS. 12 and 13 are geometrical figures given in order to illustrate the relationship between the shape of the shutter and the light energy transmitted.

FIG. 9 shows a third embodiment of the rotating shutter 50. In this example, the shutter takes the form of a blade with a double pike-head. This particular shape makes it possible to obtain a sinusoidal attenuation of the power as shown in FIG. 10. The ultraviolet power profile perceived by the guide during the photo-imprinting is shown in FIG. 11.

Figure 12:
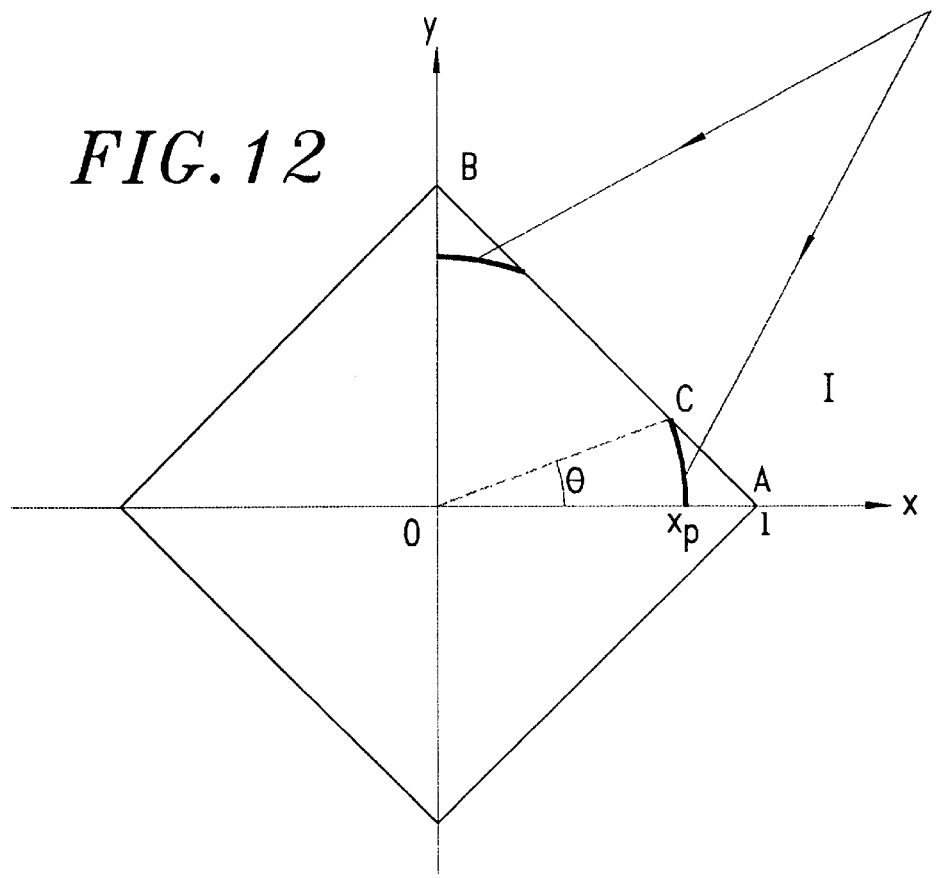
Figure 13:
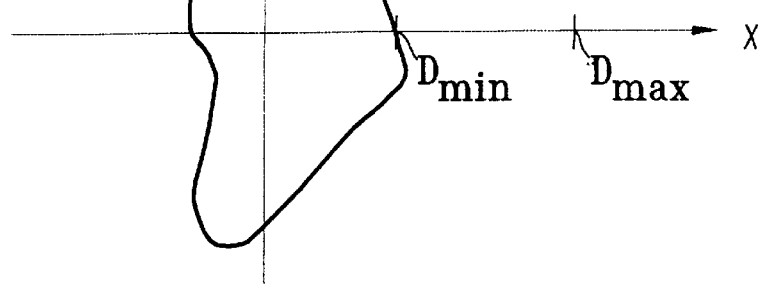

Other desired profiles may be obtained from different shapes of blades. The computations of the power profile as a function of a given blade shape or the reverse, namely the computations of a blade shape as a function of a desired shape of power profile are given hereinafter and illustrated respectively by FIGS. 12 and 13.

The following terms are used:

I (Xp) the intensity of UV radiation at the point Xp

Pmax=incident power.

Computation of the intensity transmitted in the case of a square blade

Considering one-fourth of the blade [I: X>0/Y>0].

The intensity transmitted by the device (¼ of the blade) to the point $X_p$ is given by the relationship:

$$I(X_p)=P_{max}[1-(\text{length of the circle axis blocking the beam/perimeter of the ¼ circle with the radius } X_p)]$$

giving:

$$I(X_p)=P_{max}[1-2Q\,X_p/p/2\,X_p]$$

or for the entire blade:

$$I(X_p)=P_{max}[1-8\Theta X_p/2\pi X_p]$$

giving:

$$I(X_p)=P_{max}[1-4\Theta/p] \quad (1)$$

Computation of $\Theta$

The equation of the straight line (AB) is y=−x+1 in changing to polar coordinates:

X=r cos Θ

Z=r sin Θ

The equation of the straight line becomes:

$$r=1/(\sin\Theta+\cos\Theta) \quad (2)$$

with Θ as an element of [Θ, 2π]

The point C has the following coordinates: r Cos Θ; r Sin Θ giving by means of (2)/ C:

$X_c=1/(\sin\Theta+\cos\Theta)\cos\Theta$ $Y_c=1/(\sin\Theta+\cos\Theta)\sin\Theta$ We have Sin $\Theta=Y_c/X_p=1/(\sin\Theta+\cos\Theta)\sin\Theta(1/X_p)$ By resolving the equation we obtain:

$$Q=\text{arc sin }(1/(\text{root}(2)Xp))-\pi/4$$

giving:

$$i(x_p)=P_{max}[1-(4\text{arc sin}(1/(\text{root}(2)Xp)))-\pi/p]$$

Computation of the shape of the blade when the desired intensity transmitted has a sinusoidal shape:

The 'sinusoidal' intensity at output of the blade may be given by the relationship:

$$I(X_p)=P_{max}\cdot[1-(\cos/\pi(X_p-D_{min}))/D_{max}-D_{min}]$$

In the case of a blade having two axes of symmetry, the intensity is given by the relationship:

$$I(X_p)=P_{max}[1-2\Theta/\pi] \quad (1)$$

Giving a value of Θ

$$\Theta=\pi/2\text{Cos }[\pi(X_p-D_{min}))/D_{max}-D_{min}] \quad (3)$$

The blade will therefore have the polar coordinates r and Θ such that r is an element of $[D_{min}, D_{max}]$ and $$\Theta=\pi/2\text{Cos }[(\pi(X_p-D_{min}))/D_{max}-D_{min}]$$

The curve is plotted in FIG. 11.

These computations are advantageously programmed to enable those skilled in the art to determine the shape of the blade to be chosen as a function of the desired profile or the reverse.

What is claimed is:

1. A photo-imprinting stand for the making of Bragg gratings on a photosensitive optical waveguide by the insolation of said waveguide by means of a beam of ultraviolet rays and an interferometry device, wherein said device comprises an ultraviolet source; a photosensitive optical waveguide; and a masking device with a variable surface in relation to the ultraviolet ray beam used during the photo-imprinting obtained by means of a rotary shutter.

2. A photo-imprinting stand according to claim 1, wherein the rotating shutter has a predetermined shape to obtain a profile of desired intensity.

3. A photo-imprinting stand according to claim 1, wherein the masking device comprises means to shift the rotating shutter before the beam of ultraviolet rays along the direction of the guide.

4. A photo-imprinting stand according to claim 1, wherein the beam of ultraviolet rays is a narrow beam.

5. A photo-imprinting stand according to claim 4, comprising beam scanning means.

6. A photo-imprinting stand according to claim 1, wherein shutter is formed by a square-shaped blade which, when said shutter is put into rotation and shifted before the beam, makes it possible to obtain a profile with the shape of a rectangular curve having attenuated edges for the ultraviolet power received by the guide and the fiber.

7. A photo-imprinting stand according to claim 1, wherein the shutter is formed by a blade having the shape of a double pike-head which, when said shutter is put into rotation and shifted before the beam, makes it possible to obtain a profile having the shape of a rectangular curve with sinusoidal edges for the ultraviolet power received by the guide or the fiber.

* * * * *